United States Patent
Matsuda et al.

(10) Patent No.: US 9,577,827 B2
(45) Date of Patent: *Feb. 21, 2017

(54) INFORMATION PROCESSING DEVICE, INFORMATION PROCESSING METHOD, AND PROGRAM

(71) Applicant: Sony Corporation, Tokyo (JP)

(72) Inventors: Seiichi Matsuda, Tokyo (JP); Koichi Sakumoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,638

(22) Filed: Dec. 19, 2014

(65) Prior Publication Data

US 2015/0106622 A1    Apr. 16, 2015

Related U.S. Application Data

(63) Continuation of application No. 13/973,092, filed on Aug. 22, 2013.

(30) Foreign Application Priority Data

Sep. 25, 2012  (JP) .................................. 2012-211131

(51) Int. Cl.
*H04L 29/06* (2006.01)
*H04L 9/14* (2006.01)
(Continued)

(52) U.S. Cl.
CPC ............... *H04L 9/14* (2013.01); *H04L 9/0819* (2013.01); *H04L 9/0844* (2013.01);
(Continued)

(58) Field of Classification Search
CPC ...................................................... H04L 63/10
See application file for complete search history.

(56) References Cited

U.S. PATENT DOCUMENTS 5,675,649 A   10/1997  Brennan
6,226,383 B1   5/2001  Jablon ............................ 380/30
(Continued)

FOREIGN PATENT DOCUMENTS

GB  WO 2009115824 A1 *  9/2009 ........... H04L 9/3093
JP       4820928           9/2011

OTHER PUBLICATIONS

Office Action dated Jun. 8, 2016 issued in U.S. Appl. No. 13/973,092, 32 pp.

(Continued)

*Primary Examiner* — Izunna Okeke
*Assistant Examiner* — Hee Song
(74) *Attorney, Agent, or Firm* — Chip Law Group

(57) ABSTRACT

There is provided an information processing device including a secret key generator that generates a secret key from a random number received from an external device that provides a service, and a given value, a public key generator that generates a public key on the basis of the secret key by using a function identically set in a plurality of the services, a transmitter that transmits the public key to the external device, and an authentication processor that conducts authentication with the external device using the secret key.

9 Claims, 12 Drawing Sheets

(51) Int. Cl.
  *H04L 9/08* (2006.01)
  *H04L 9/30* (2006.01)
(52) U.S. Cl.
  CPC .............. *H04L 9/0869* (2013.01); *H04L 9/30* (2013.01); *H04L 9/308* (2013.01); *H04L 2209/24* (2013.01)

(56) References Cited

U.S. PATENT DOCUMENTS

| | | | | |
|---|---|---|---|---|
| 7,068,787 | B1 | 6/2006 | Ta et al. | 380/240 |
| 8,811,608 | B2* | 8/2014 | Sella | H04L 9/3093 380/30 |
| 8,850,203 | B2 | 9/2014 | Sundaram et al. | 713/169 |
| 2004/0165726 | A1 | 8/2004 | Yamamichi et al. | 380/277 |
| 2006/0177056 | A1* | 8/2006 | Rostin | H04L 9/0869 380/46 |
| 2008/0013716 | A1* | 1/2008 | Ding | H04L 9/3093 380/30 |
| 2008/0298582 | A1 | 12/2008 | Sakai | 380/44 |
| 2009/0010428 | A1* | 1/2009 | Delgosha | H04L 9/3093 380/30 |
| 2009/0316897 | A1 | 12/2009 | Kambayashi et al. | 380/255 |
| 2010/0257363 | A1 | 10/2010 | Kiran et al. | 713/169 |
| 2010/0325435 | A1* | 12/2010 | Park | H04L 9/0844 713/171 |
| 2011/0243320 | A1 | 10/2011 | Halevi | |
| 2013/0159704 | A1* | 6/2013 | Chandrasekaran | G06F 21/57 713/156 |
| 2013/0329883 | A1 | 12/2013 | Tamayo-Rios | 380/28 |
| 2014/0223193 | A1* | 8/2014 | Sakumoto | H04L 9/3252 713/189 |

OTHER PUBLICATIONS

Non-Final Office Action cited in U.S. Appl. No. 13/973,092, mailed Oct. 20, 2016, 21 pages.

* cited by examiner

PUBLIC-KEY AUTHENTICATION SCHEME

INFORMATION PROCESSING DEVICE, INFORMATION PROCESSING METHOD, AND PROGRAM

CROSS-REFERENCE TO RELATED APPLICATIONS

This application is a continuation of U.S. Ser. No. 13/973,092, filed Aug. 22, 2013, which claims the benefit of priority under 35 U.S.C. §119 from Japanese Application Serial Number 2012-211131, filed Sep. 25, 2012. The entire content of each of the foregoing applications is incorporated herein by reference.

BACKGROUND

The present disclosure relates to an information processing device, an information processing method, and a program.

In the related art, Japanese Patent No. 04820928 describes technology that conducts authentication using hash value of a password input by a user and a fixed value sent from a server.

SUMMARY

However, with the above technology of the related art, since authentication is conducted using a fixed value transmitted from a server, if the fixed value is leaked, a user with malicious intent may unfortunately gain unauthorized access to the server.

Consequently, there is demand to reliably mitigate unauthorized access due to the leak of a key.

According to an embodiment of the present disclosure, there is provided an information processing device including a secret key generator that generates a secret key from a random number received from an external device that provides a service, and a given value, a public key generator that generates a public key on the basis of the secret key by using a function identically set in a plurality of the services, a transmitter that transmits the public key to the external device, and an authentication processor that conducts authentication with the external device using the secret key.

The given value may be a fixed value.

Also, the given value may be generated from a random number.

The given value may be an input password.

The public key generator may generate the public key from an MQ function and the secret key.

The secret key generator may generate the secret key by performing a hash computation on the random number and the given value.

A master secret key that differs from the secret key may be used as the given value.

The secret key generator may generate the secret key from the received random number every time authentication with the external device is conducted. The information processing device may further include secret key storage that stores the generated secret key. The public key generator may generate a different public key on the basis of the secret key for each of a plurality of the external devices that provide a service.

According to an embodiment of the present disclosure, there is provided an information processing method including generating a secret key from a random number received from an external device that provides a service, and a given value, generating a public key on the basis of the secret key by using a function identically set in a plurality of the services, transmitting the public key to the external device, and conducting authentication with the external device using the secret key.

According to an embodiment of the present disclosure, there is provided a program causing a computer to function as a secret key generator that generates a secret key from a random number received from an external device that provides a service, and a given value, a public key generator that generates a public key on the basis of the secret key by using a function identically set in a plurality of the services, a transmitter that transmits the public key to the external device, and an authentication processor that conducts authentication with the external device using the secret key.

According to an embodiment of the present disclosure, reliably mitigating unauthorized access due to the leak of a key becomes possible.

DETAILED DESCRIPTION OF THE EMBODIMENT(S)

Figure 1:
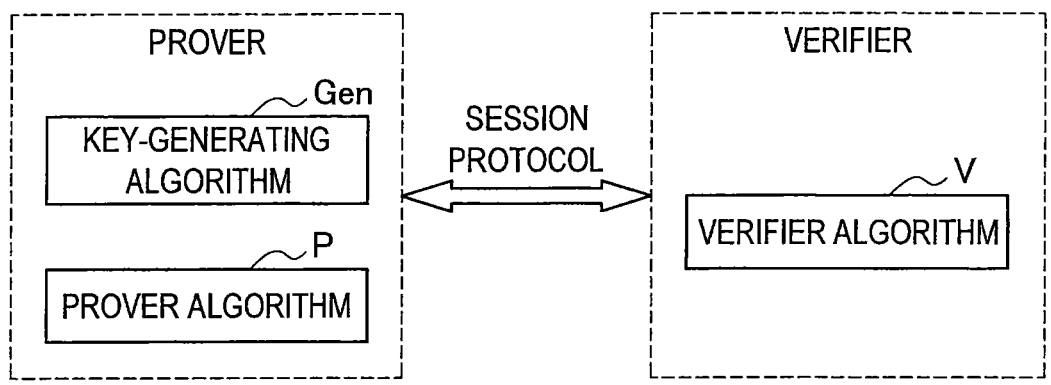
FIG. 1 is a diagram illustrating algorithms for a public-key authentication scheme.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of the description regarding the embodiments of the present technology described hereinafter will be now briefly discussed. First, an algorithm structure for a public-key authentication scheme will be described with reference to FIG. 1. Next, an n-pass public-key authentication scheme will be described with reference to FIG. 2.

Next, an example of algorithm structures related to a 3-pass public-key authentication scheme will be described with reference to FIG. 3. Next, an exemplary hardware configuration of an information processing apparatus capable of realizing the respective algorithms according to the embodiment of the present technology will be described with reference to FIG. 12.

Hereinafter, the description will proceed in the following order.

1. Introduction
  1-1. Algorithms for public-key authentication scheme
  1-2. N-pass public-key authentication scheme
2. Algorithm structures related to 3-pass public-key authentication scheme
  2-1. Example of specific algorithm structures
3. Exemplary configuration of system according to embodiment
  3-1. Password authentication and public-key authentication
  3-2. The case where public keys match among different users
  3-3. Summary of system according to embodiment
  3-4. Process flow according to embodiment
  3-5. Exemplary configuration of system according to embodiment
  3-6. Modifications of embodiment
4. Exemplary hardware configuration <1. Introduction>

The present embodiment relates to user authentication when a user uses a service. First, a public-key authentication scheme that bases its safety on the difficulty of solving high-order, multivariate systems of equations (hereinafter also referred to as the MQ protocol in some cases) will be described as a user authentication scheme preferred for application to the present embodiment. However, the present embodiment herein differs from techniques of the related art such as HFE electronic signature schemes, and relates to a public-key authentication scheme that utilizes high-order, multivariate systems of equations that lack a way of efficient solving (trapdoors). Note that authentication schemes applicable to the embodiment herein are not limited to the above, and that it is possible to broadly apply other public-key authentication schemes. First, algorithms for a public-key authentication scheme and an n-pass public-key authentication scheme will be briefly summarized.

[1-1. Algorithms for Public-Key Authentication Scheme]

First, algorithms for a public-key authentication scheme will be summarized with reference to FIG. 1. FIG. 1 is an explanatory diagram algorithms for public-key authentication scheme.

Public-key authentication is used in order for a certain person (the prover, also referred to as Alice) to convince another person (the verifier, also referred to as Bob) that she is herself by using a public key pk and a secret key sk. For example, Alice's public key $pk_A$ is disclosed to Bob. On the other hand, Alice keeps her secret key $sk_A$ a secret. In the public-key authentication setup, it is assumed that Alice herself is the person who knows the secret key $sk_A$ corresponding to the public key $pk_A$.

In order for Alice to prove to Bob that she is Alice herself using the public-key authentication setup, Alice, via a session protocol, presents proof to Bob indicating that she knows the secret key $sk_A$ corresponding to the public key $pk_A$. The proof indicating the Alice knows the secret key $sk_A$ is then presented to Bob, and in the case where Bob is able to confirm that proof, the validity of Alice (the fact that Alice is herself) is proven.

However, a public-key authentication setup demands the following conditions in order to ensure safety.

The first condition is that a forger who does not possess the secret key sk when executing the session protocol has a vanishingly small probability of creating a forgery. Upholding the first condition is called "soundness". In other words, soundness may be restated as: "a forger lacking a secret key sk has a negligible chance of establishing a forgery during the session protocol." The second condition is that no information about Alice's secret key $sk_A$ is divulged to Bob, even if executing the session protocol. Upholding the second condition is called "zero-knowledge".

Conducting public-key authentication safely involves using a session protocol exhibiting both soundness and zero-knowledge. If an authentication process were hypothetically conducted using a session protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

As illustrated in FIG. 1, the two identities of prover and verifier exist in a model of a public-key authentication scheme. The prover uses a key-generating algorithm Gen to generate a paired secret key sk and public key pk unique to the prover. Subsequently, the prover uses the paired secret key sk and public key pk generated using the key-generating algorithm Gen to execute a session protocol with a verifier. At this point, the prover executes the session protocol by using a prover algorithm P. As above, the prover uses the prover algorithm P to present proof that she possesses the secret key sk to the verifier during the session protocol.

Meanwhile, the verifier executes the session protocol using a verifier algorithm V, and verifies whether or not the prover possesses the secret key corresponding to the public key made public by that prover. In other words, the verifier is an entity that verifies whether or not the prover possesses the secret key that corresponds to the public key. In this way, the model of a public-key authentication scheme is made up of the two entities of the verifier and the verifier, and the three algorithms of the key-generating algorithm Gen, the prover algorithm P, and the verifier algorithm V.

Figure 12:
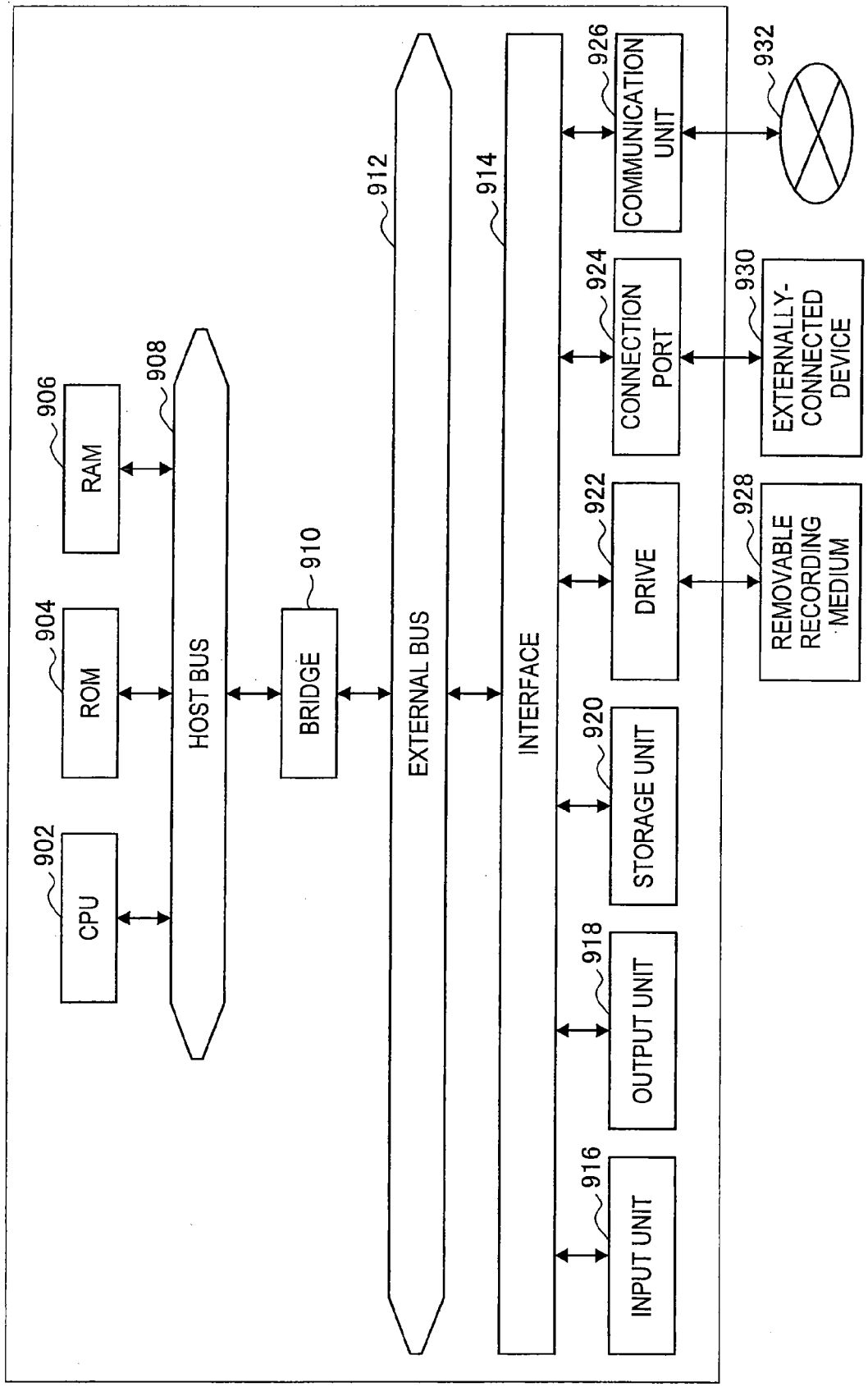
FIG. 12 is a schematic diagram illustrating a hardware configuration of an information processing device.

Note that although the terms "prover" and "verifier" are used in the description hereinafter, these terms ultimately mean entities. Consequently, the agent that executes the key-generating algorithm Gen and the prover algorithm P is an information processing apparatus corresponding to the "prover" entity. Similarly, the agent that executes the verifier algorithm V is an information processing apparatus. The hardware configuration of these information processing apparatus is as illustrated in FIG. 12, for example. In other words, the key-generating algorithm Gen, the prover algorithm P, and the verifier algorithm V are executed by a device such as a CPU 902 on the basis of a program recorded onto a device such as ROM 904, RAM 906, a storage unit 920, or a removable medium 928.

(Key-Generating Algorithm Gen)

The key-generating algorithm Gen is used by the prover. The key-generating algorithm Gen is an algorithm that generates a paired secret key sk and public key pk unique to the prover. The public key pk generated by the key-generating algorithm Gen is made public. The public key pk thus made public is then used by the verifier. Meanwhile, the prover keeps the secret key sk generated by the key-generating algorithm Gen a secret. The secret key sk kept secret by the prover is then used to prove to the verifier that the prover possesses the secret key sk corresponding to the public key pk. Formally, the key-generating algorithm Gen is expressed as an algorithm like the following Eq. 1, which accepts a security parameter $1^\lambda$ (where $\lambda$ is an integer equal to or greater than 0) as input, and outputs a secret key sk and a public key pk.

$$(sk, pk) \leftarrow \text{Gen}(1^\lambda) \tag{1}$$

(Prover Algorithm P)

The prover algorithm P is used by the prover. The prover algorithm P is an algorithm for proving to the verifier that the prover possesses the secret key sk corresponding to the public key pk. In other words, the prover algorithm P is an algorithm that accepts a secret key sk and a public key pk as input, and executes a session protocol.

(Verifier Algorithm V)

The verifier algorithm V is used by the verifier. The verifier algorithm V is an algorithm that verifies whether or not the prover possesses the secret key sk corresponding to the public key pk during the session protocol. The verifier algorithm V is an algorithm that accepts a public key pk as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following Eq. 2.

$$0/1 \leftarrow V(pk) \tag{2}$$

As above, realizing meaningful public-key authentication involves having the session protocol satisfy the two conditions of soundness and zero-knowledge. However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be revealed to the verifier. For this reason, the above key-generating algorithm Gen, prover algorithm P, and verifier algorithm V are skillfully designed to satisfy these requirements.

The foregoing thus summarizes the algorithms in a public-key authentication scheme.

[1-2. N-Pass Public-Key Authentication Scheme]

Figure 2:
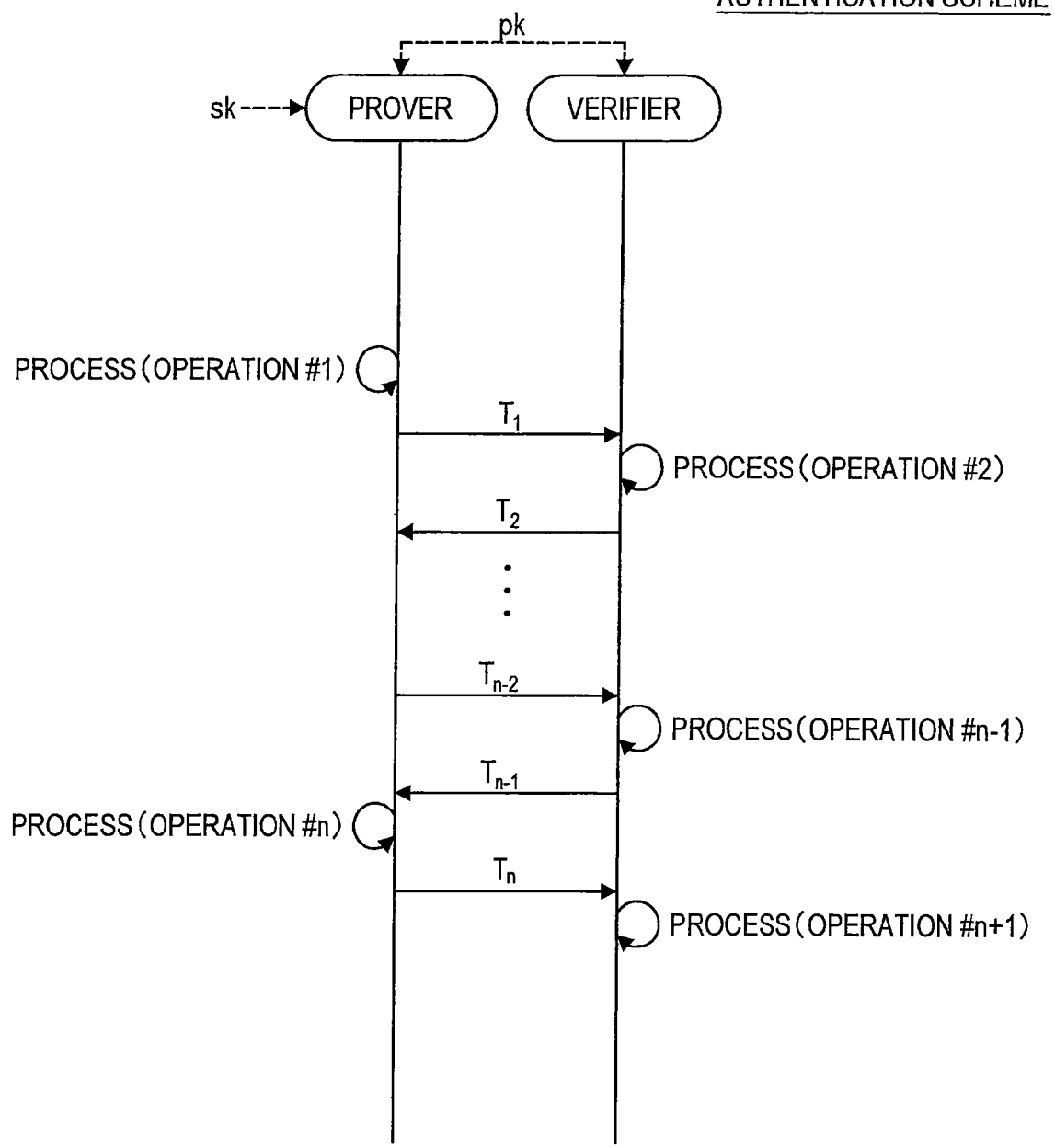
FIG. 2 is an explanatory diagram illustrating an n-pass public-key authentication scheme.

Next, an n-pass public-key authentication scheme will be described with reference to FIG. 2. FIG. 2 is an explanatory diagram illustrating an n-pass public-key authentication scheme.

As above, a public-key authentication scheme is an authentication scheme that proves to a verifier that a prover possesses a secret key sk corresponding to a public key pk during a session protocol. In addition, the session protocol has to satisfy the two conditions of soundness and zero-knowledge. For this reason, during the session protocol both the prover and the verifier exchange information n times while executing respective processes, as illustrated in FIG. 2.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n, and lastly, a process (operation #n+1) is executed. Transmitting and receiving information n times in this way is thus called an "n-pass" public-key authentication scheme.

The foregoing thus describes an n-pass public-key authentication scheme.

<2. Algorithm Structures Related to 3-Pass Public-Key Authentication Scheme>

Hereinafter, algorithms related to a 3-pass public-key authentication scheme will be described. Note that in the following description, a 3-pass public-key authentication scheme may also be referred to as a "3-pass scheme" in some cases.

[2-1. Example of Specific Algorithm Structures (FIG. 3)]

Figure 3:
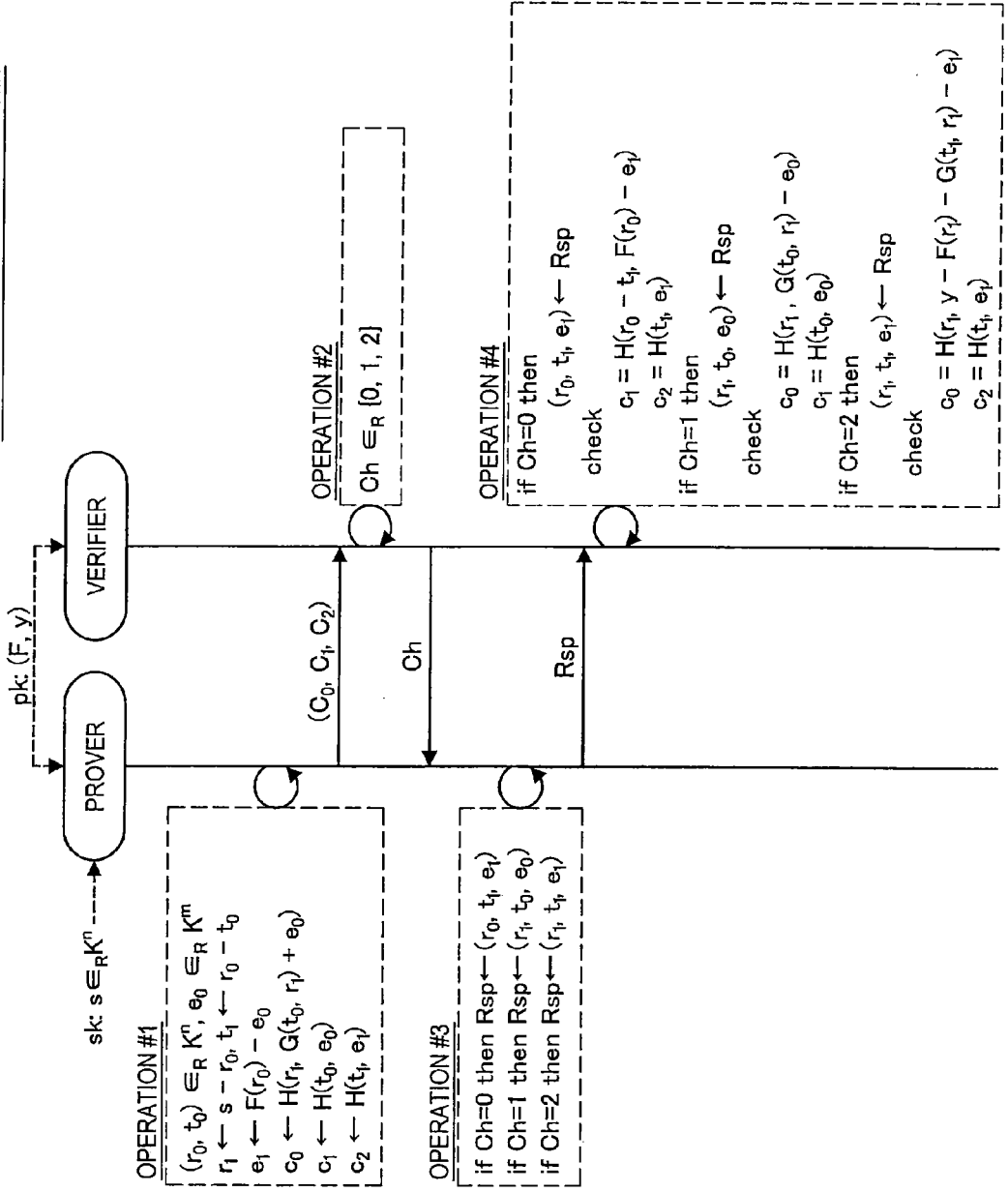
FIG. 3 is a diagram illustrating specific algorithm structures related to a 3-pass scheme.

First, an example of specific algorithm structures related to a 3-pass scheme will be introduced with reference to FIG. 3. FIG. 3 is a diagram illustrating specific algorithm structures related to a 3-pass scheme. At this point, consider the case of using a system of second-order polynomials $(f_1(x), \ldots, f_m(x))$ as part of a public key pk. However, assume that a second-order polynomial $f_i(x)$ is expressed as in the following Eq. 6. In addition, x will denote the vectors $(x_1, \ldots, x_n)$, and the multivariate polynomial $F(x)$ will denote the system of second-order polynomials $(f_1(x), \ldots, f_m(x))$.

$$f_i(x_1, \ldots, x_n) = \sum_{j,k} a_{ijk} x_j x_k + \sum_j b_{ij} x_j \tag{6}$$

The system of second-order polynomials $(f_1(x), \ldots, f_m(x))$ may also be expressed as in the following Eq. 7, where $A_1$ to $A_m$ are $n \times n$ matrices, and $b_1$ to $b_m$ are respective $n \times 1$ vectors.

$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \tag{7}$$

Using this expression, the multivariate polynomial F may be expressed as in the following Eq. 8 and 9. These expressions may be easily confirmed from Eq. 10 below.

$$F(x+y) = F(x) + F(y) + G(x, y) \tag{8}$$

$$G(x, y) = \begin{pmatrix} y^T (A_1^T + A_1) x \\ \vdots \\ y^T (A_m^T + A_m) x \end{pmatrix} \tag{9}$$

$$\begin{aligned} f_l(x+y) &= (x+y)^T A_l (x+y) + b_l^T (x+y) \\ &= x^T A_l x + x^T A_l y + y^T A_l x + y^T A_l y + b_l^T x + b_l^T y \\ &= f_l(x) + f_l(y) + x^T A_l y + y^T A_l x \\ &= f_l(x) + f_l(y) + x^T (A_l^T)^T y + y^T A_l x \\ &= f_l(x) + f_l(y) + (A_l^T x)^T y + y^T A_l x \\ &= f_l(x) + f_l(y) + y^T (A_l^T x) + y^T A_l x \\ &= f_l(x) + f_l(y) + y^T (A_l^T + A_l) x \end{aligned} \tag{10}$$

When dividing $F(x+y)$ into a first portion dependent on x, a second portion dependent on y, and a third portion dependent on both x and y in this way, the term $G(x, y)$ corresponding to the third portion becomes bilinear with respect to x and y. Hereinafter, the term G(x, y) may be referred to as the bilinear term in some cases. Using this property enables the construction of an efficient algorithm.

For example, use the vector $t_0$ that is an element of the set $K^n$ and the vector $e_0$ that is an element of the set $K^m$ to express the multivariate polynomial $F^1(x)$, which is used to mask the multivariate polynomial $F(x+r)$, as $F_1(x)=G(x, t_0)+e_0$. In this case, the sum of the multivariate polynomial $F(x+r_0)$ and $G(x)$ is expressed as in Eq. 11 below. Provided that $t_1=r_0+t_0$ and $e_1=F(r_0)+e_0$, the multivariate polynomial $F_2(x)=F(x+r_0)+F_1(x)$ can be expressed by the vector $t_1$ that is an element of the set $K^n$ and the vector $e_1$ that is an element of the set $K^m$. For this reason, setting $F_1(x)=G(x, t_0)+e_0$ enables the expression of $F_1$ and $F_2$ using a vector in $K^n$ and a vector in $K^m$, making it possible to realize an efficient algorithm with a small data size for communication.

$$F(x+r_0) + F_1(x) = F(x) + F(r_0) + G(x, r_0) + G(x, t_0) + e_0 \quad (11)$$
$$= F(x) + G(x, r_0+t_0) + F(r_0) + e_0$$

Note that no information regarding $r_0$ is divulged from $F_2$ (or $F_1$). For example, even if $e_1$ and $t_1$ (or $e_0$ and $t_0$) are given, no information about $r_0$ is ascertained as long as $e_0$ and $t_0$ (or $e_1$ and $t_1$) are unknown. Consequently, zero-knowledge is ensured. Hereinafter, algorithms for a 3-pass scheme constructed on the basis of the above logic will be described. The algorithms for the 3-pass scheme described herein are made up of a key-generating algorithm Gen, a prover algorithm P, and a verifier algorithm V like the following.

(Key-Generating Algorithm Gen)

The key-generating algorithm Gen generates m multivariate polynomials $f_1(x_1, \ldots, x_n), \ldots, f_m(x_1, \ldots, x_n)$ defined on a ring K, and a vector $s=(s_1, \ldots, s_n)$ that is an element of the set $K^n$. Next, the key-generating algorithm Gen calculates $y=(y_1, \ldots, y_m)\leftarrow(f_1(s), \ldots, f_m(s))$. The key-generating algorithm Gen also sets $f_1(x_1, \ldots, x_n), \ldots, f_m(x_1, \ldots, x_n)$ as the public key, and set s as the secret key.

(Prover Algorithm P, Verifier Algorithm V)

Hereinafter, a process executed by the prover algorithm P and a process executed by the verifier algorithm V during the session protocol will be described with reference to FIG. 3. During the session protocol, the prover indicates to the verifier that "I know an s satisfying y=F(s)", without divulging information about the secret key s to the verifier. Meanwhile, the verifier verifies whether or not the prover knows an s satisfying y=F(s). Note that the public key pk is assumed to be made public to the verifier. Also, the secret key s is assumed to be kept a secret by the prover. Hereinafter, the description will proceed following the flowchart illustrated in FIG. 3.

Operation #1:

As illustrated in FIG. 3, the prover algorithm P first randomly generates the vector $r_0, t_0$ that is an element of the set $K^n$, and the vector $e_0$ that is an element of the set $K^m$. Subsequently, the prover algorithm P calculates $r_1 \leftarrow s-r_0$. This calculation is equivalent to masking the secret key s with the vector $r_0$. Additionally, the prover algorithm P calculates $t_1 \leftarrow r_0-t_0$. Subsequently, the prover algorithm P calculates $e_1 \leftarrow F(r_0)-e_0$.

Operation #1 (Continued):

Subsequently, the prover algorithm P calculates $c_0 \leftarrow H(r_1, G(t_0, r_1) e_0)$. Subsequently, the prover algorithm P calculates $c_1 \leftarrow H(t_0, e_0)$. Subsequently, the prover algorithm P calculates $c_2 \leftarrow H(t_1, e_1)$. The message $(c_0, c_1, c_2)$ generated in operation #1 is sent to the verifier algorithm V.

Operation #2:

Upon receiving the message $(c_0, c_1, c_2)$, the verifier algorithm V selects which verification pattern to use from among three verification patterns. For example, the verifier algorithm V may select a numerical value from among three numerical values $\{0, 1, 2\}$ representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response Rsp=$(r_0, t_1, e_1)$. In the case where Ch=1, the prover algorithm P generates a response Rsp=$(r_1, t_0, e_0)$. In the case where Ch=2, the prover algorithm P generates a response Rsp=$(1), t_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1=H(r_0-t_1, F(r_0)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V verifies whether or not the equality of $c_0=H(r_1, G(t_0, r_1)+e_0)$ holds. In addition, the verifier algorithm V verifies whether or not the equality of $c_1=H(t_0, e_0)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V verifies whether or not the equality of $c_0=H(r_1, y-F(r_1)-G(t_1, r_1)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

The foregoing thus describes an example of efficient algorithm structures related to a 3-pass scheme.

<3. Exemplary Configuration of System According to Embodiment>

[3-1. Password Authentication and Public-Key Authentication]

Besides public-key authentication as described above, ordinary password authentication that uses an ID and a password is widely used. With password authentication, in the case where one user uses two services, such as online shopping and Internet banking, for example, the user logs in using a different ID and password for the two services. In this way, with typical password authentication, the user registers a separate password for each service, which involves managing a list stating an ID and password for each service.

Meanwhile, with the public-key authentication scheme described above, a user is able to register the same public key pk corresponding to a secret key sk in his or her own possession in each service, and thus the user is able to use multiple services with just a single secret key sk. Note that the secret key sk and the public key pk correspond to each other, and provided that f is an MQ function, a relationship of pk=f(sk) is established. Also, with the public-key authentication scheme as described above, it is possible to reduce the key storage size to approximately ½ to 1/10 in the case of 80-bit security, compared to the case of configuring a system with other public-key technologies. Consequently, according to a public-key authentication scheme, it is possible to minimize the key storage size, without registering a public key pk for each service.

Figure 4:
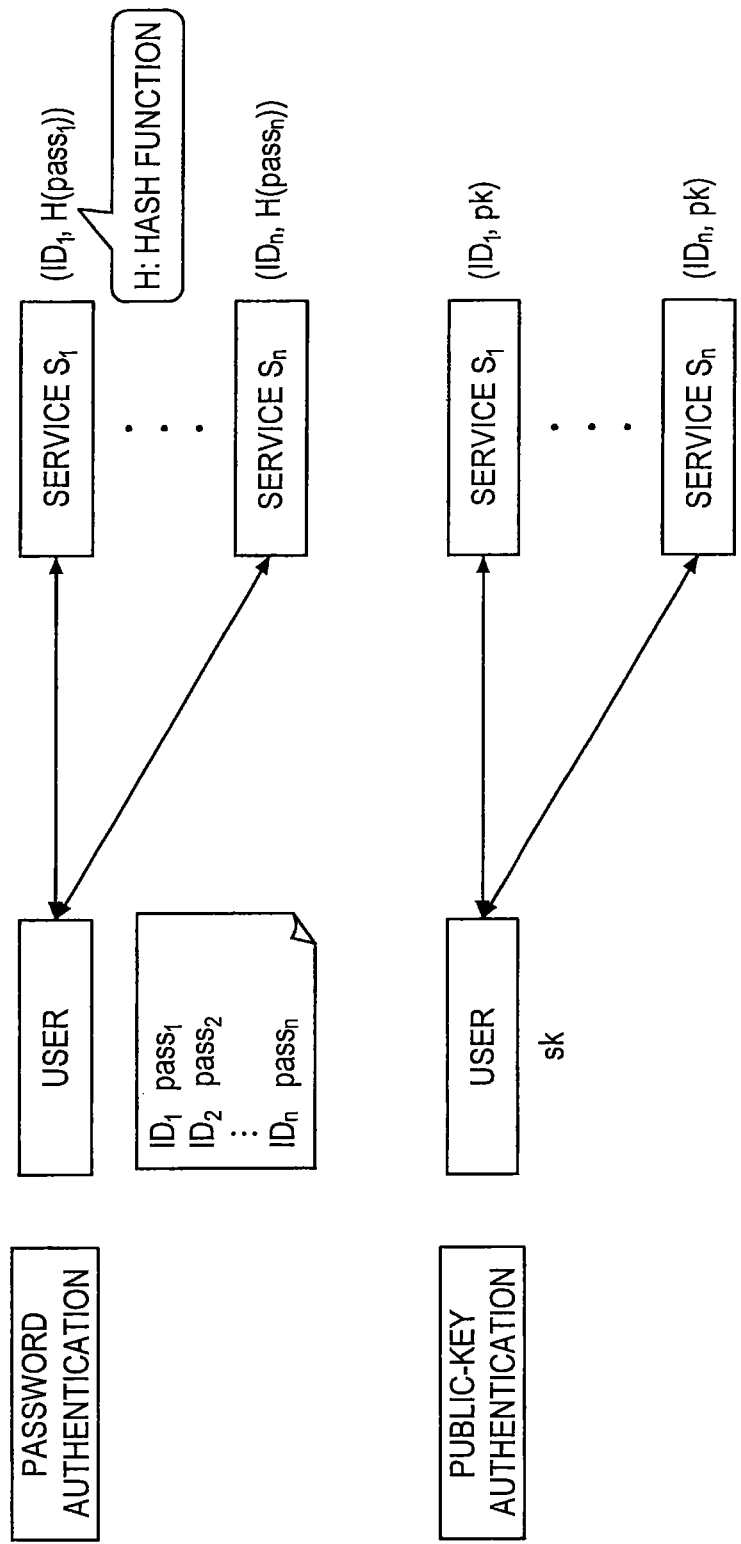
FIG. 4 is a schematic diagram illustrating differences between password authentication and public-key authentication.

FIG. 4 is a schematic diagram illustrating differences between password authentication and public-key authentication. As illustrated in FIG. 4, password authentication involves a user storing, for each of n services $S_1$ to $S_n$, an $ID_1$ and a password 1 ($pass_1$), an $ID_2$ and a password 2 ($pass_2$), and so on to an $ID_n$ and a password n ($pass_n$). Meanwhile, with public-key authentication, a user is able to use a common public key pk for each service. The common public key pk corresponds to the user's secret key sk, with the value obtained by substituting the secret key sk into an MQ function becoming the public key pk. Consequently, the user is capable of utilizing n services $S_1$ to $S_n$ by storing only a single secret key sk. Thus, it becomes possible to decrease user burden and not demand that the user manage an $ID_n$ and a password n ($pass_n$) for each service as with password authentication.

[3-2. The Case where Public Keys Match Among Different Users]

By using public-key authentication as above, a user is able to use a common public key pk among different services. On the other hand, if a common public key pk is used among different services, the possibility exists with some likelihood that different users will set the same public key. For example, assuming that the MQ authentication has 80-bit key security strength, and that the same MQ function f is used, if $2^{40}$ public keys pk are collected, there is a ½ likelihood that one pair with matching public keys pk exists. This phenomenon is not unique to MQ authentication, but rather occurs because of the short 80-bit key length of the public key. Particularly, in the case where the distribution of secret keys sk is biased rather than uniform, the distribution of public keys pk corresponding to the secret keys sk also becomes biased, and the ½ likelihood that one pair with matching public keys pk exist may occur even in cases where less than $2^{40}$ public keys pk are collected.

Figure 5:
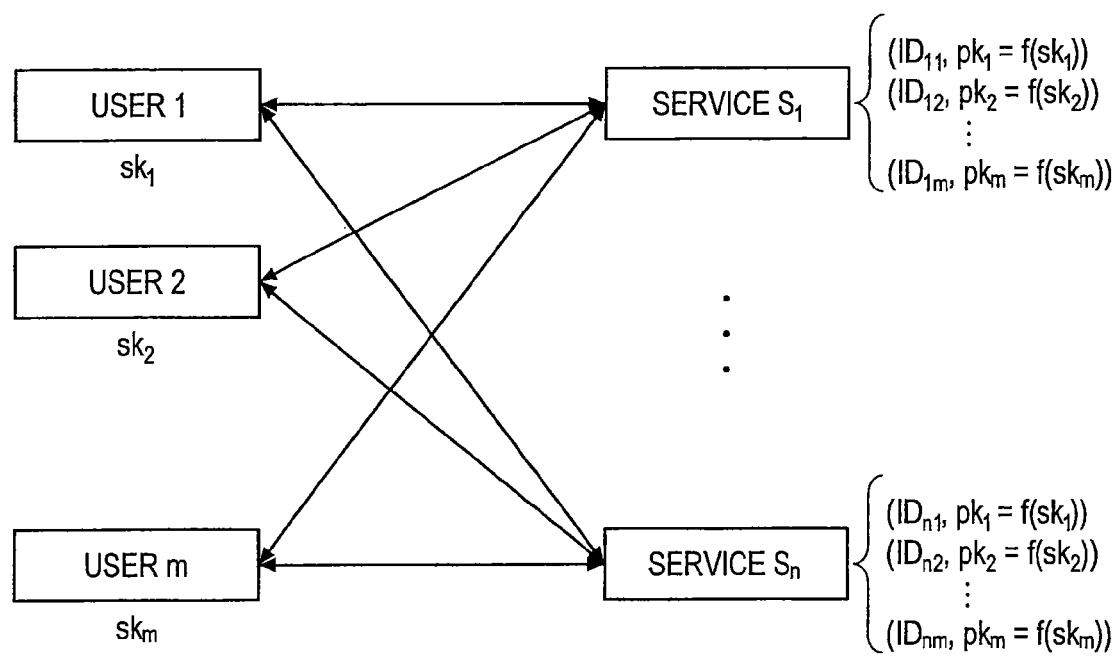
FIG. 5 is a schematic diagram illustrating a state in which multiple users have registered IDs and public keys with multiple services.

To describe this state on the basis of FIG. 5, in the case of using the same MQ function f among n services, there exists a number of combinations of a secret key $sk_m$ and a public key $pk_m$ equal to the number of users m. In FIG. 5, provided that the number of users of m and the number of services S is n, the user 1, user 2, user 3, . . . , user m respectively store secret keys $sk_1$, $sk_2$, $sk_3$, . . . , $sk_m$. Registered in the service $S_1$ are an $ID_{11}$ and public key $pk_1$ (where $pk_1$=f($sk_1$)) corresponding to the user 1. Also registered in the service $S_1$ are an $ID_{12}$ and public key $pk_2$ (where $pk_2$=f($sk_2$)) corresponding to the user 2, an $ID_{13}$ and public key $pk_3$ (where $pk_3$=f($sk_3$)) corresponding to the user 3, and so on to an $ID_{1m}$ and public key $pk_m$ (where $pk_m$=f($sk_m$)) corresponding to the user m. Similarly, registered in the service $S_n$ are an $ID_{n1}$ and public key $pk_1$ (where $pk_1$=f($sk_1$)) corresponding to the user 1, an $ID_{n2}$ and public key $pk_2$ (where $pk_2$=f($sk_2$)) corresponding to the user 2, and so on to an $ID_{nm}$ and public key $pk_m$ (where $pk_m$=f($sk_m$)) corresponding to the user m. If the number of users m reaches $2^{40}$ under such circumstances, there will be a ½ likelihood that the same public key pk exists.

Figure 6:
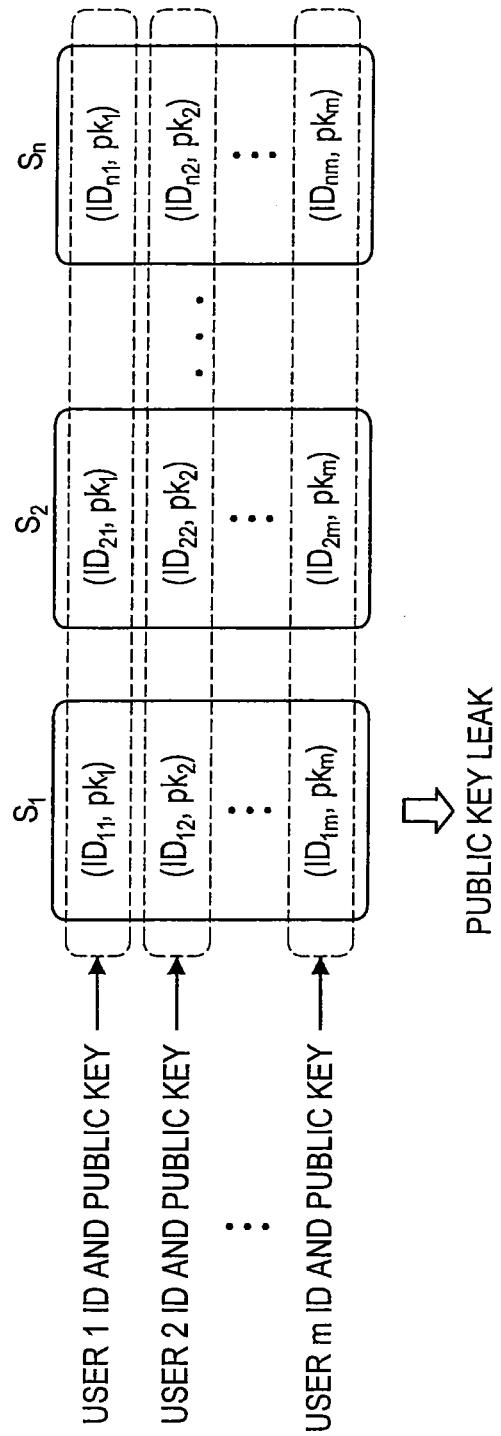
FIG. 6 is a schematic diagram illustrating a case where a public key pk is leaked from a service $S_1$.

FIG. 6 is a schematic diagram illustrating as an example the case where a public key pk is leaked from a service S1. Assuming the above likelihood that the public key $pk_2$ of the user 2 and the public key $pk_m$ of the user m are identical ($pk_2$=$pk_m$), FIG. 6 demonstrates that the user 2 and the user m will be using the same secret key sk, since there is a one-to-one correspondence between public keys pk and secret keys sk. In this case, since the user 2 and the user m have registered the same public keys $pk_2$ and $pk_m$ (where $pk_2$=$pk_m$) in services other than $S_1$, ascertaining the IDs results in a state where the user 2 and the user m are able to use the same secret key sk and access all of each other's services $S_1$ to $S_n$. For example, in the case where the user 2 has malicious intent, the user 2 is able to use the user m's IDs and use the secret key sk to access the services $S_1$ to $S_n$ while impersonating the user m.

[3-3. Summary of System According to Embodiment]

In light of key leaks as above, in the present embodiment, random numbers $rnd_1$, . . . , $rnd_n$ provided on the side of the services $S_1$, $S_2$, . . . , $S_n$ are used to generate a different secret key for each service $S_1$, $S_2$, . . . , $S_n$ on the side of the users. By generating a secret key for each service $S_1$, $S_2$, . . . , $S_n$, a user is able to use a secret key and public key that differ for each service.

Figure 7:
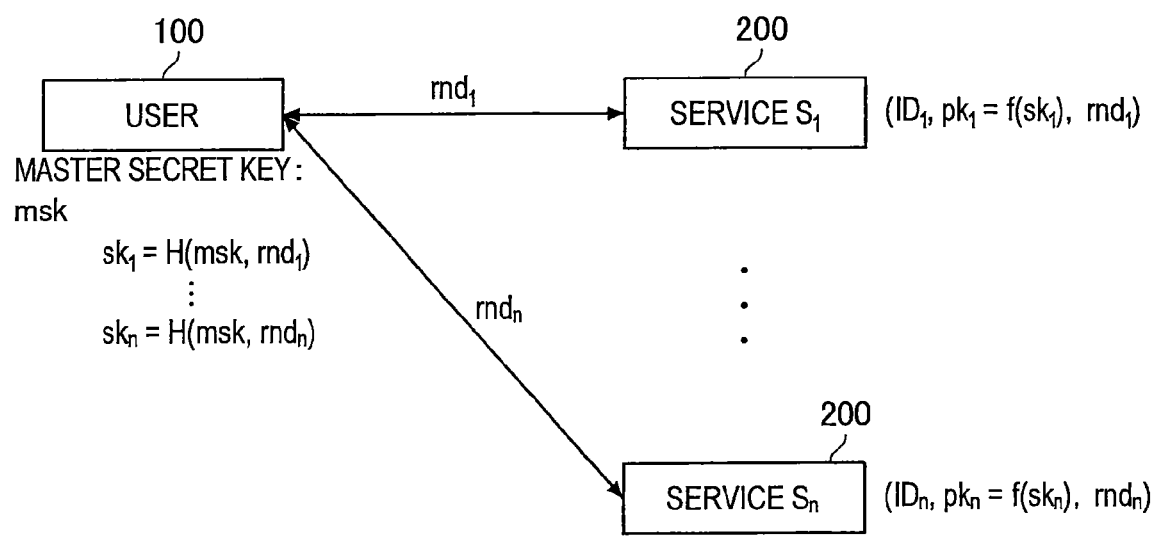
FIG. 7 is a schematic diagram summarizing a system according to an embodiment.

FIG. 7 is a schematic diagram summarizing a system according to the present embodiment. First, a client device 100 on the user side creates a master secret key msk. A hash value (a hash function) is then calculated between a random number $rnd_i$ transmitted from a server (external device) 200 for a service $S_i$ (where i=1 to n) and the master secret key msk to obtain a secret key $sk_i$. In other words, $sk_i$=H(msk, $rnd_i$). The client device 100 then derives a public key $pk_i$ by computing $pk_i$=f($sk_i$), and transmits the derived public key $pk_i$ to the service $S_i$. Thus, the public key $pk_i$ is registered in the service $S_i$. On the side of the service $S_i$, the set ($ID_i$, $pk_i$=f($sk_i$), $rnd_i$) of an $ID_i$, a public key $pk_i$, and a random number $rnd_i$ is saved.

By conducting the above process for the services S1, S2, . . . , $S_n$, each server 200 corresponding to the services $S_1$, $S_2$, . . . , $S_n$ store ($ID_i$, $pk_i$=f($sk_i$), $rnd_i$) (where i=1 to n).

When authenticating, the random number $rnd_i$ that was used during registration is transmitted from the service $S_i$ to a user. At the user's client device 100, a secret key $sk_i$ is generated similarly to the time of service registration, and the MQ authentication scheme described in FIGS. 1 to 3 starts. The client device 100 corresponds to the prover, while the server 200 corresponds to the verifier. If the server 200 authenticates the client device 100, the client device 100 becomes able to access the server 200 that provides a service $S_i$. According to the present embodiment, since a secret key $sk_i$ is corresponding to a particular service $S_i$ is generated for every authentication, it is sufficient to store just the one master secret key msk on the client device 100 side.

Figure 8:
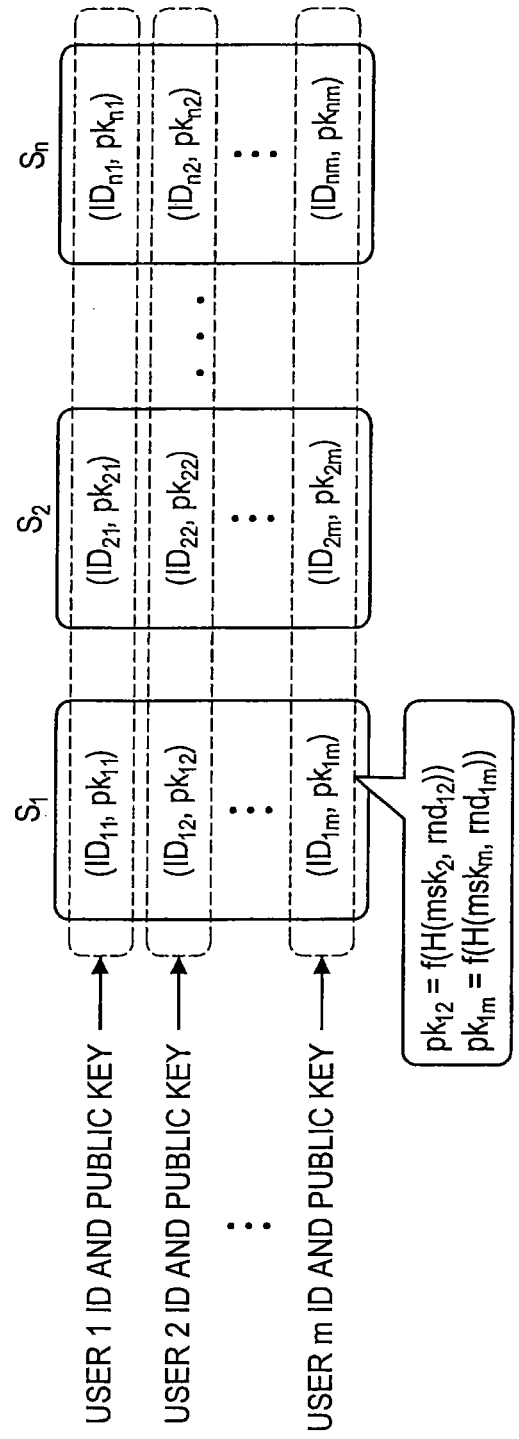
FIG. 8 is a schematic diagram illustrating a state in which different public keys $pk_1, pk_2, \ldots, pk_n$ are registered for individual services $S_1, S_2, \ldots, S_n$.

Thus, as illustrated in FIG. 8, different public keys $pk_1$, $pk_2$, . . . , $pk_n$ are registered in respective services $S_1$, $S_2$, . . . , $S_n$, and thus even if the same public key pair exists for different users in service $S_1$, for example, and that public key is leaked, it is still possible to keep the master secret key msk from being leaked. Since each client device 100 generates a secret key sk from a master secret key msk, access by impersonation as described with FIG. 6 are highly unlikely. Assuming that the user 2 and the user m have the same public key for the service $S_1$ ($pk_{12}$=$pk_{1m}$), FIG. 8 demonstrates that H($msk_2$, $rnd_{12}$)=H($msk_m$, $rnd_{1m}$).

Although the random numbers $rnd_{12}$ and $rnd_{1m}$ are not secret, the user 2 and the user m are unable to determine each other's master secret keys $msk_2$ and $msk_m$ because of the one-way nature of the hash function.

Furthermore, according to the present embodiment, even if biasing occurs in the values of master secret keys msk due to factors such as users using a poor quality secret key generating function GenKey, a secret key sk is generated from the hash value of a master secret key msk and a random number rnd. Since the random number rnd is generated on the server 200 side and is a uniformly distributed random number, generating a highly safe secret key sk is possible, even if the safety of the master secret key msk is comparatively low.

[3-4. Process Flow According to Embodiment]

Figure 9:
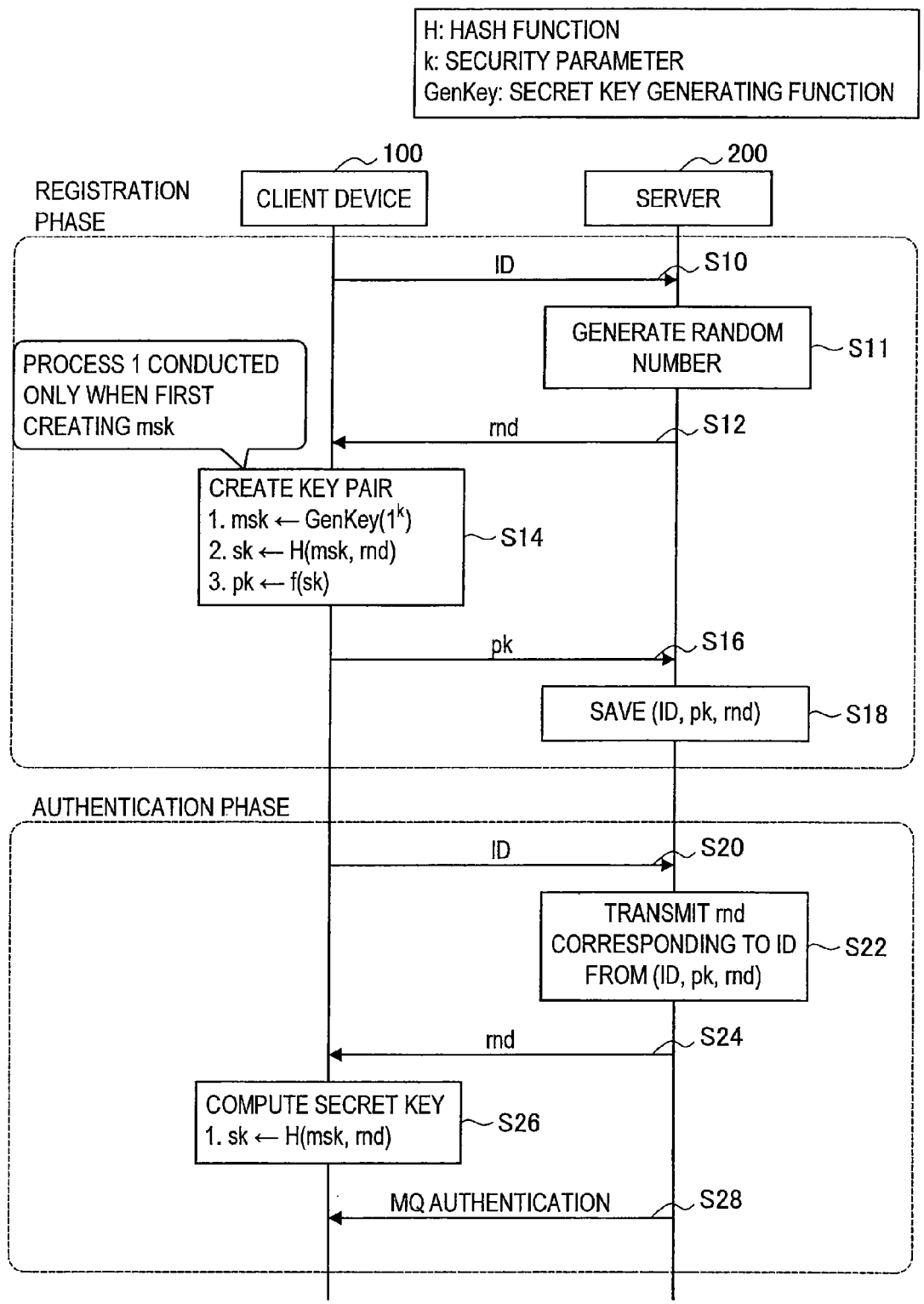
FIG. 9 is a schematic diagram illustrating a process flow according to an embodiment.

FIG. 9 is a schematic diagram illustrating a process flow according to the present embodiment, and illustrates a process conducted between a client device 100 on the user side and a server 200 on the service provider side. In this flow, steps S10 to S18 illustrate a public key registration phase, while steps S20 to S28 illustrate an authentication phase.

In the registration phase, first, in step S10 the client device 100 transmits an ID to the server 200. In the next step S11, the server 200 generates a random number rnd. In the next step S12, the server 200 transmits the random number rnd to the client device 100.

In the next step S14, the client device 100 creates a key pair of a secret key sk and a public key pk. At this point, in the case where a master secret key msk has not been generated, a master secret key msk is generated from a secret key generating function GenKey($1^k$). The secret key generating function GenKey($1^k$) generates a master secret key msk by extracting a key length of length k from a random number sequence. A hash value of the master secret key msk and the random number rnd is computed to generate a secret key sk (sk=H(msk, rnd)), and the secret key sk is substituted into an MQ function f to generate a public key pk (pk=f(sk)). In the next step S16, the client device 100 transmits the secret key sk to the server 200. In the next step S28, the server 200 saves the set (ID, pk, rnd) of ID, pk, and rnd.

In the authentication phase, first, in step S20 the client device 100 transmits an ID to the server 200. In the next step S22, the server 200 extracts the rnd corresponding to the ID transmitted in step S20 from among saved sets of ID, pk, and rnd. In the next step S24, the server 200 transmits the extracted rnd to the client device 100. In the next step S26, the client device 100 computes a secret key sk. At this point, the client device 100 computes a secret key sk by taking a hash value of a master secret key msk and the random number rnd transmitted in step S24 (sk=H(msk, rnd)). In the next step S28, MQ authentication is conducted according to the techniques described in FIGS. 1 to 3. At this point, the client device 100 corresponds to the prover, while the server 200 corresponds to the verifier.

[3-5. Exemplary Configuration of System According to Embodiment]

Figure 10:
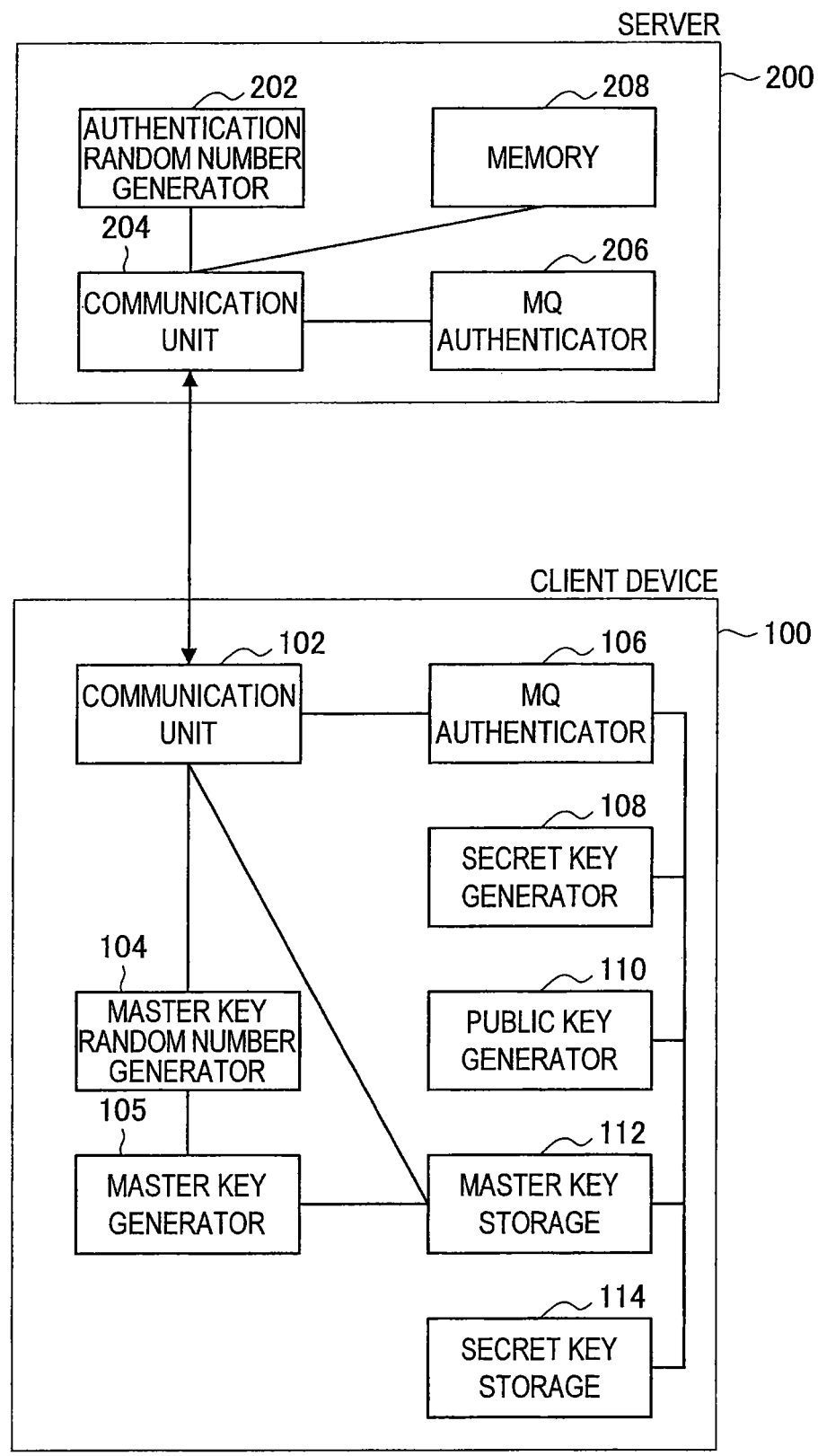
FIG. 10 is a schematic diagram illustrating an exemplary configuration of a system according to an embodiment.

FIG. 10 is a schematic diagram illustrating an exemplary configuration of a system according to the present embodiment. As illustrated in FIG. 10, the client device 100 includes a communication unit 102, a master key random number generator 104, a master key generator 105, an MQ authenticator 106, a secret key generator 108, a public key generator 110, master key storage 112, and secret key storage 114. Also, the server 200 includes an authentication random number generator 202, a communication unit 204, an MQ authenticator 206, and memory 208.

The communication unit 102 of the client device 100 transmits and receives information to and from the communication unit 204 of the server 200. The master key random number generator 104 generates a random number used to generate a master secret key msk. The master key generator 105 generates a master secret key msk by extracting a key length of length k from a random number sequence generated by the master key random number generator 104. The value of k may be the same as the bit length of the secret key in the MQ public-key scheme, or a larger value. Herein, the value of k is set to "80", the same as the size of the secret key in the MQ public-key scheme. Note that since a secret key sk is generated by computing a hash value with a random number sent from the server side, the master key random number generator 104 of the client device 100 is still acceptable even if not of high quality. The MQ authenticator 106 conducts the MQ authentication processes described in FIGS. 1 to 3. Specifically, the MQ authenticator 106 conducts a process that includes operation #1 and operation #3 illustrated in FIG. 3. The secret key generator 108 generates a secret key sk from a random number rnd sent from the server 200, and a master secret key msk. At this point, using a larger value of k to generate a master secret key msk makes it possible to generate a higher-entropy secret key sk. The public key generator 110 generates a public key pk from an MQ function f and a secret key sk. The master key storage 112 stores the generated master secret key msk.

The communication unit 204 of the server 200 transmits and receives information to and from the communication unit 102 of the client device 100. The authentication random number generator 202 generates a random number rnd used for authentication. Since the random number rnd is used when generating a secret key sk at the client device 100, the authentication random number generator 202 is desirably of higher quality than the master key random number generator 104 of the client device 100 so that the secret key sk does not take a biased value. The MQ authenticator 206 conducts the MQ authentication processes discussed earlier. Specifically, the MQ authenticator 206 conducts a process that includes operation #2 and operation #4 illustrated in FIG. 3. The memory 208 saves sets (ID, pk, rnd) of ID, pk, and rnd.

Note that the respective structural elements illustrated in FIG. 10 may be realized by hardware (circuits), or by a program (software) causing a processor such as a CPU to function as the structural elements. In this case, the program may be stored on a recording medium, such as memory provided in the respective devices (the client device 100 and the server 200), or external memory externally connected to the respective devices.

[3-6. Modifications of Embodiment]

Although the foregoing describes the client device 100 generating a secret key sk from a master secret key msk for every authentication, the client device 100 may also save a secret key sk that has been generated. In this case, after generating a secret key sk in step S14 of FIG. 9, the secret key sk is stored in the secret key storage 114 in FIG. 10. Since the secret key sk differs for each service, the secret key storage 114 stores a secret key sk for every service S. Thus, the processing in steps S22 to S26 of FIG. 9 may be omitted, making it possible to immediately conduct the MQ authentication of step S28 during authentication. Consequently, the authentication process may be simplified.

Figure 11:
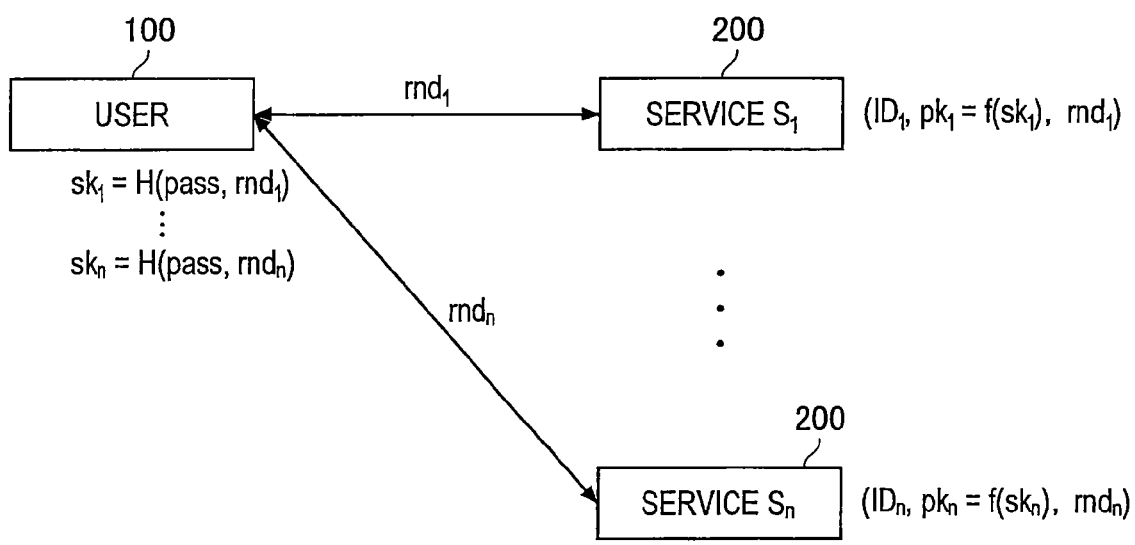
FIG. 11 is a schematic diagram illustrating an example of generating a secret key sk from a hash value of a password pass and a random number rnd.

Also, as a modification of the foregoing embodiment, a password (pass) may be used instead of a master secret key msk. In this case, the client device 100 generates a secret key sk from a hash value of a password pass and a random number rnd rather than storing a master secret key msk, as illustrated in FIG. 11. In the process flow, instead of generating a master secret key msk in step S14 of FIG. 9, the secret key generator 108 in FIG. 10 generates a secret key sk from a hash value of a password pass and a random number rnd. Then, during authentication, a secret key sk is generated from a hash value of a password pass and a random number rnd in step S26 of FIG. 9. In this case, a secret key sk that has been generated may likewise be stored in the secret key storage 114 rather than generating a secret key sk every time. Note that the processing on server 200 side is similar to the foregoing embodiment.

<5. Exemplary Hardware Configuration (FIG. 12)>

It is possible to execute the respective algorithms above by using the hardware configuration of an information processing apparatus illustrated in FIG. 12, for example. In other words, the processing by each algorithm is realized by using a computer program to control the hardware illustrated in FIG. 12. Note that the format of this hardware is arbitrary, and encompasses personal computers, mobile phones, portable information terminals such as PHS devices and PDAs, game consoles, contact or contactless IC chips, contact or contactless IC cards, and various information appliances, for example. Note that PHS above is an abbreviation of Personal Handy-phone System, while PDA above is an abbreviation of personal digital assistant.

As illustrated in FIG. 12, the hardware primarily includes a CPU 902, ROM 904, RAM 906, a host bus 908, and a bridge 910. The hardware additionally includes an external bus 912, an interface 914, an input unit 916, an output unit 918, a storage unit 920, a drive 922, a connection port 924, and a communication unit 926. Note that CPU above is an abbreviation of central processing unit, while ROM above is an abbreviation of read-only memory, and RAM above is an abbreviation of random access memory.

The CPU 902 functions as a computational processing device or control device, for example, and controls all or part of the operation of each structural element on the basis of various programs recorded in the ROM 904, the RAM 906, the storage unit 920, or a removable recording medium 928. The ROM 904 is a way of storing information such as programs loaded by the CPU 902 and data used in computations. The RAM 906 transiently or persistently stores information such as programs loaded by the CPU 902, and various parameters that change as appropriate when executing such programs, for example.

These structural elements are interconnected via a host bus 908 capable of high-speed data transmission, for example. Meanwhile, the host bus 908 is connected via the bridge 910 to an external bus 912 having comparatively low-speed data transmission, for example. Devices such as a mouse, keyboard, touch panel, buttons, switches, and levers may be used as the input unit 916, for example. Additionally, a remote control (hereinafter, remote) capable of using infrared or other electromagnetic waves to transmit control signals may be used as the input unit 916 in some cases.

The output unit 918 includes a device capable of visually or aurally reporting acquired information to a user, and may be a display device such as a CRT, LCD, PDP, or ELD, an audio output device such as one or more speakers or headphones, a printer, a mobile phone, or a fax machine, for example. Note that CRT above is an abbreviation of cathode ray tube, while LCD above is an abbreviation of liquid crystal display, PDP above is an abbreviation of plasma display panel, and ELD above is an abbreviation of electroluminescent display.

The storage unit 920 is a device that stores various data. Devices such as a hard disk drive or other magnetic storage device, a semiconductor storage device, an optical storage device, or a magneto-optical storage device may be used as the storage unit 920, for example. Note that HDD above is an abbreviation of hard disk drive.

The drive 922 is a device that reads out information recorded onto a removable recording medium 928 such as a magnetic disk, an optical disc, a magneto-optical disc, or semiconductor memory, for example, and may also write information to the removable recording medium 928. The removable recording medium 928 is an instance of DVD media, Blu-ray media, HD DVD media, or various semiconductor storage media, for example. Obviously, the removable recording medium 928 may also be an IC card mounted with a contactless IC chip, or other electronic device, for example. Note that IC above is an abbreviation of integrated circuit.

The connection port 924 is a port that connects to an externally-connected device 930, such as a USB port, an IEEE 1394 port, a SCSI port, an RS-232C port, or an optical audio terminal, for example. The externally-connected device 930 may be a printer, a portable music player, a digital camera, a digital video camera, or an IC recorder, for example. Note that USB above is an abbreviation of Universal Serial Bus, while SCSI above is an abbreviation of Small Computer System Interface.

The communication unit 926 is a communication device that connects to a network 932, and may be a communication card for wired or wireless LAN, Bluetooth (registered trademark), or WUSB, an optical communication router, an ADSL router, or a device for contact or contactless communication, for example. Also, the network 932 connected to the communication unit 926 is a network connected in a wired or wireless manner, and may be the Internet, a home LAN, infrared communication, visible light communication, broadcasting, or satellite communication, for example. Note that LAN above is an abbreviation of local area network, while WUSB above is an abbreviation of Wireless USB, and ADSL above is an abbreviation of asymmetric digital subscriber line.

The technical matter discussed in the foregoing may be applied to various information processing apparatus, such as PCs, mobile phones, game consoles, information terminals, information appliances, and car navigation systems, for example. Note that the functions of the information processing apparatus discussed below are realizable using a single information processing apparatus, and also realizable using multiple information processing apparatus. Also, the data storing mechanism and computing mechanism used when the information processing apparatus discussed below executes a process may be provided in that information processing apparatus, and may also be provided in equipment connected via a network.

According to the present embodiment as described above, a secret key sk is generated from a random number provided to a client device 100 from the server 200, and information (a master secret key msk or a password pass) that acts as a basis for the secret key. A public key pk is then generated from the generated secret key sk. Consequently, even if a situation such as matching public keys pk match between users occurs, it becomes possible to reliably suppress leakage of the information that acts as a basis for a secret key sk. Thus, it is possible to reliably mitigate unauthorized access by a user with malicious intent.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing device including:
a secret key generator that generates a secret key from a random number received from an external device that provides a service, and a given value;
a public key generator that generates a public key on the basis of the secret key by using a function identically set in a plurality of the services;
a transmitter that transmits the public key to the external device; and
an authentication processor that conducts authentication with the external device using the secret key.

(2) The information processing device according to (1), wherein
the given value is a fixed value.

(3) The information processing device according to (1), wherein
the given value is an input password.

(4) The information processing device according to any one of (1) to (3), wherein
the secret key generator generates the secret key from the received random number every time authentication with the external device is conducted.

(5) The information processing device according to any one of (1) to (3), further including:
secret key storage that stores the generated secret key.

(6) The information processing device according to any one of (1) to (5), wherein
the public key generator generates a different public key on the basis of the secret key for each of a plurality of the external devices that provide a service.

(7) The information processing device according to any one of (1) to (6), wherein
the public key generator generates the public key from an MQ function and the secret key.

(8) The information processing device according to any one of (1) to (7), wherein
the secret key generator generates the secret key by performing a hash computation on the random number and the given value.

(9) The information processing device according to (2), wherein
a master secret key that differs from the secret key is used as the given value.

(10) An information processing method including:
generating a secret key from a random number received from an external device that provides a service, and a given value;
generating a public key on the basis of the secret key by using a function identically set in a plurality of the services;
transmitting the public key to the external device; and
conducting authentication with the external device using the secret key.

(11) A program causing a computer to function as:
a secret key generator that generates a secret key from a random number received from an external device that provides a service, and a given value;
a public key generator that generates a public key on the basis of the secret key by using a function identically set in a plurality of the services;
a transmitter that transmits the public key to the external device; and
an authentication processor that conducts authentication with the external device using the secret key.

The present disclosure contains subject matter related to that disclosed in Japanese Priority Patent Application JP 2012-211131 filed in the Japan Patent Office on Sep. 25, 2012, the entire content of which is hereby incorporated by reference.

What is claimed is:

1. An information processing device, comprising:
circuitry configured to:
store a secret key that is generated from a hash value computed between a master secret key and a random number received from an external device that provides a service;
generate, by using a function identically set in a plurality of the services, a public key from a Multivariate Quadratic (MQ) function and the secret key generated from the hash value and the random number;
transmit the public key to the external device; and
conduct authentication with the external device using the secret key,
wherein the circuitry is configured to receive the random number based on transmission of identity data from the information processing device to the external device.

2. The information processing device according to claim 1, wherein the circuitry is configured to generate the secret key every time the authentication with the external device is conducted.

3. The information processing device according to claim 1, wherein the circuitry is configured to generate a different public key on the basis of the secret key for each of a plurality of the external devices that provide the service.

4. The information processing device according to claim 1, wherein the master secret key differs from the secret key.

5. The information processing device according to claim 1, wherein the stored secret key is not shared with the external device.

6. The information processing device according to claim 1, wherein a different secret key is generated for each of the plurality of services.

7. The information processing device according to claim 1,
wherein the master secret key differs from the secret key, and
wherein the master secret key is generated by extracting a key length of length k from a random number sequence.

8. An information processing method, comprising:
storing, by a circuit, a secret key that is generated from a hash value computed between a master secret key and a random number received from an external device that provides a service;
generating, by a circuit, using a function identically set in a plurality of the services, a public key from a Multivariate Quadratic (MQ) function and the secret key;
transmitting, by the circuit, the public key to the external device; and
conducting, by the circuit, authentication with the external device using the secret key,
wherein the random number is received from the external device based on transmission of identity data from the information processing device to the external device.

9. A non-transitory computer-readable storage medium including a program stored thereon, which, when executed by a computer, causes the computer to perform operations, comprising:
- storing a secret key that is generated from a hash value computed between a master secret key and a random number received from an external device that provides a service;
- generating, using a function identically set in a plurality of the services, a public key from a Multivariate Quadratic (MQ) function and the secret key;
- transmitting the public key to the external device; and
- conducting authentication with the external device using the secret key,
- wherein the random number is received from the external device based on transmission of identity data from the information processing device to the external device.

\* \* \* \* \*